(12) United States Patent
McCue

(10) Patent No.: US 7,702,110 B2
(45) Date of Patent: Apr. 20, 2010

(54) ELECTRONIC DOCUMENT PROTECTION SYSTEM AND METHOD

(75) Inventor: Daniel L. McCue, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1020 days.

(21) Appl. No.: 11/142,462

(22) Filed: Jun. 2, 2005

(65) Prior Publication Data

US 2006/0288236 A1    Dec. 21, 2006

(51) Int. Cl.
*H04L 9/08* (2006.01)
(52) U.S. Cl. .................. 380/278; 713/171; 713/193
(58) Field of Classification Search ............. 380/54, 380/277–278; 713/171, 193
See application file for complete search history.

(56) References Cited

U.S. PATENT DOCUMENTS

| | | | |
|---|---|---|---|
| 4,728,984 A * | 3/1988 | Daniele | 358/300 |
| 5,486,686 A * | 1/1996 | Zdybel et al. | 235/375 |
| 5,598,477 A * | 1/1997 | Berson | 380/51 |
| 5,692,048 A * | 11/1997 | Gormish et al. | 380/246 |
| 6,330,549 B1 * | 12/2001 | Merkle | 705/51 |
| 6,499,665 B1 * | 12/2002 | Meunier et al. | 235/487 |
| 2007/0050696 A1 * | 3/2007 | Piersol et al. | 715/500 |
| 2007/0136588 A1 * | 6/2007 | DeYoung et al. | 713/171 |

* cited by examiner

*Primary Examiner*—Nasser Moazzami
*Assistant Examiner*—Travis Pogmore
(74) *Attorney, Agent, or Firm*—Oliff & Berridge, PLC

(57) ABSTRACT

A document protection method may include retrieving a document from a memory device, encrypting the document using an encryption tool, imaging a decryption key on an imaging medium, and reading the decryption key to decrypt the document. A document protection system may include at least one controller configured to control imaging of a decryption key on a medium, a memory storage device configured to store a document, an decryption tool configured to encrypt the document, and a decryption tool configured to read the decryption key to decrypt the document.

17 Claims, 5 Drawing Sheets

CONVENTIONAL ART

ELECTRONIC DOCUMENT PROTECTION SYSTEM AND METHOD

BACKGROUND

Programs and data prepared for public distribution may need to be protected from theft, tampering and other unauthorized uses. Conventional attempts to protect such programs and data include storing on a CD ROM, a floppy disk or the like for protection against piracy. These attempts have mostly failed to achieve their purpose because determined rogues have easily circumvented conventional safeguards to retrieve what is supposed to be protected.

Other methods of data protection include encrypting data to be supplied so that only a user having an appropriate decryption key may decrypt the data in question. However, it is impossible for such methods to completely eliminate the possibility of the decrypted data being subsequently stolen, tampered with or otherwise abused because decrypted data are stored in memory or in fixed disk drives after decryption. Moreover, the rightful owner or accessor of the data must have a means to acquire, store, transport, and/or supply the key.

One solution to such problems is a data processing apparatus with security functions that operates under a scheme whereby encrypted data are again ciphered when placed in internal memory and then deciphered at the point of use when retrieved therefrom and executed by a central processing unit. Such a scheme involves installing an encryption device and a decryption device for software protection within the data processing apparatus.

For example, FIG. 1 is a block diagram of a conventional data processing apparatus designed for such software protection. The apparatus comprises a central processing unit (CPU) 210, a storage device 240, an input device 220, an output device 230 and a key input device 250. The CPU 210 contains an arithmetic unit 212, a control unit 211, an encryption-decryption unit 213 and a key storage unit 214.

The CPU 210 functions as a core of the data processing apparatus, operating on data and controlling component devices. The storage device 240 stores data and exchanges data with the encryption-decryption unit 213 in the CPU 210 under control of the CPU 210.

The input device 220 receives data from outside the data processing apparatus under control of the CPU 210. The output device 230, also controlled by the CPU 210, outputs data from the data processing apparatus. The key input device 250 sets keys necessary for encrypting and decrypting data.

The arithmetic unit 212 in the CPU 210 performs arithmetic and logic operations on the data from the input device 220 or the storage device 240. The control unit 211 controls the data processing apparatus itself. The key storage unit 214 accommodates keys set by the key input device 250. The encryption-decryption unit 213, interposed between the storage device 240 and the arithmetic unit 212, decrypts the encrypted instructions and data from the storage device 240 by use of keys in the key storage unit 214 in such a manner that the decrypted instructions and data may be interpreted and processed by the control unit 211 and the arithmetic unit 212, respectively. In addition, upon storing a result computed by the arithmetic unit 212 into the storage device 240, the encryption-decryption unit 213 encrypts the target data using keys from the key storage unit 214 and stores the encrypted target data in the storage device 240.

Such a conventional data processing apparatus keeps the data encrypted in the storage device 240. This means that any data stolen from the storage device 240 are difficult to interpret, whereby data security is supposed to be enhanced.

In such a data processing apparatus with software protecting functions, encrypted and stored data need to be decrypted whenever accessed or executed. This requires the apparatus to adopt a cipher system of relatively simple algorithms in view of the need to reduce the overhead of data decryption. The result may be a lowered level of encryption security. It is thus necessary to maximize the security of data encryption even in conjunction with relatively simple algorithms. Moreover, the cipher systems may be complex, although the complexity of the cipher system may impact its performance. In particular, more complex algorithms may require complex keys that may be too difficult for a user to memorize and may need to be stored on a medium.

Furthermore, electronic documents may need to be secured to ensure confidentiality, authenticity and to protect against corruption. Because such documents exist in electronic form, the electronic documents are typically secured by encryption. The keys to these encrypted files are generally also electronic objects consisting of strings of letters, symbols and/or numbers. Such concepts are further explained in, for example, "Cryptography Theory and Practice," by Douglas Stinson.

SUMMARY

Efforts to avoid the problem of adopting a cipher system of relatively simple algorithms in view of the need to reduce the overhead of data decryption include employing a different encryption method for each data processing apparatus and to keep such encryption methods confidential. These methods lead to another problem: a significant decrease in data interchangeability. Moreover, the frequency of specific instruction codes appearing in programs and the correspondence of encrypted programs to how the apparatus operates may provide clues to how encryption algorithms and decryption keys are constituted. This means that conventional efforts have not necessarily increased the level of encryption security for individual data processing apparatuses.

Moreover, while short keys may be remembered by individuals with legitimate interest in the object, longer more secure keys are typically recorded in electronic form also so that the keys may be transmitted to the security software for proper decryption. If the keys are to be physically removed from the securing system, the keys must be recorded on physically removable electronic storage devices which are relatively costly and themselves vulnerable to attack.

In light of the above described problems and shortcomings, various exemplary embodiments provide a document protection method including retrieving the document from a memory device, encrypting the document using an encryption tool, imaging a decryption key on a medium that can be physically removed from the device, stored, and transported, decrypting the decryption key and reading the decryption key to decrypt the document.

Moreover, various exemplary implementations provide a document protection system including at least one controller configured to control imaging of a decryption key on a medium, a memory storage device configured to store a document, an encryption tool configured to encrypt the document, and a decryption tool configured to read the decryption key to decrypt the document.

In exemplary embodiments, the decryption key for an electronic document may be printed on a medium such as, for example, paper, then deleted from the electronic system altogether, thus making possession of the medium a necessary part of decrypting and accessing the electronic document.

When it is time to decrypt the electronic object, the medium may be scanned and decoded, and the key re-constructed from the information scanned from the medium.

These and other features and advantages are described in, or are apparent from, the following detailed description of various exemplary embodiments of systems and methods.

BRIEF DESCRIPTION OF THE DRAWINGS

Various exemplary embodiments of the systems and methods will be described in detail, with reference to the following figures, wherein.

DETAILED DESCRIPTION OF EMBODIMENTS

Figure 1:
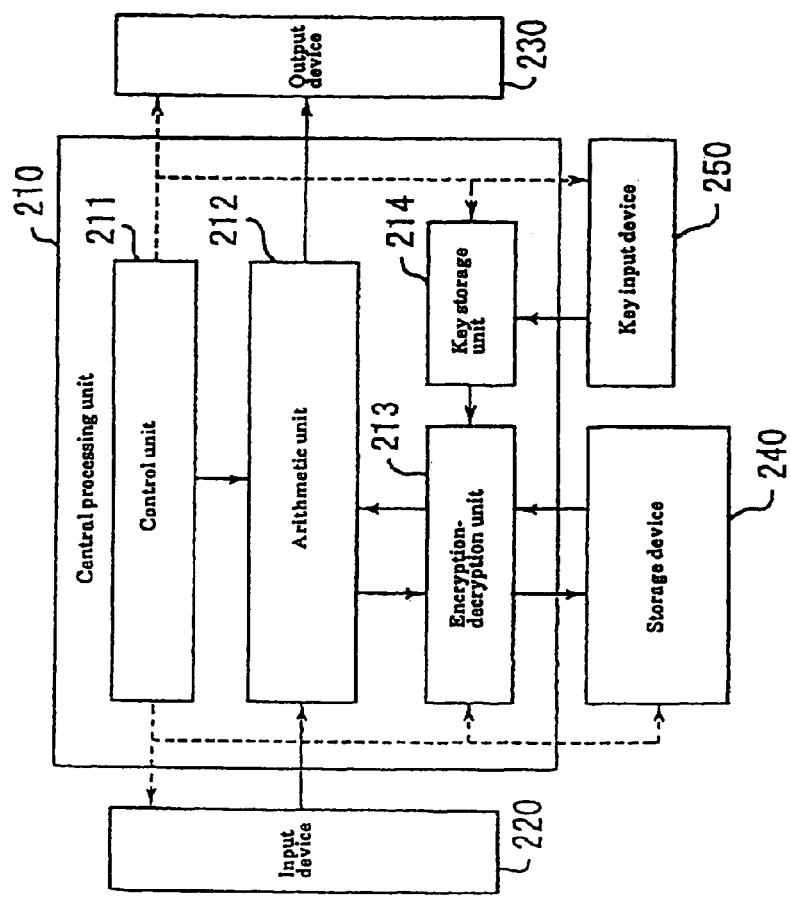
FIG. 1 is a block diagram of a conventional data processing apparatus designated for software protection.
Figure 2:
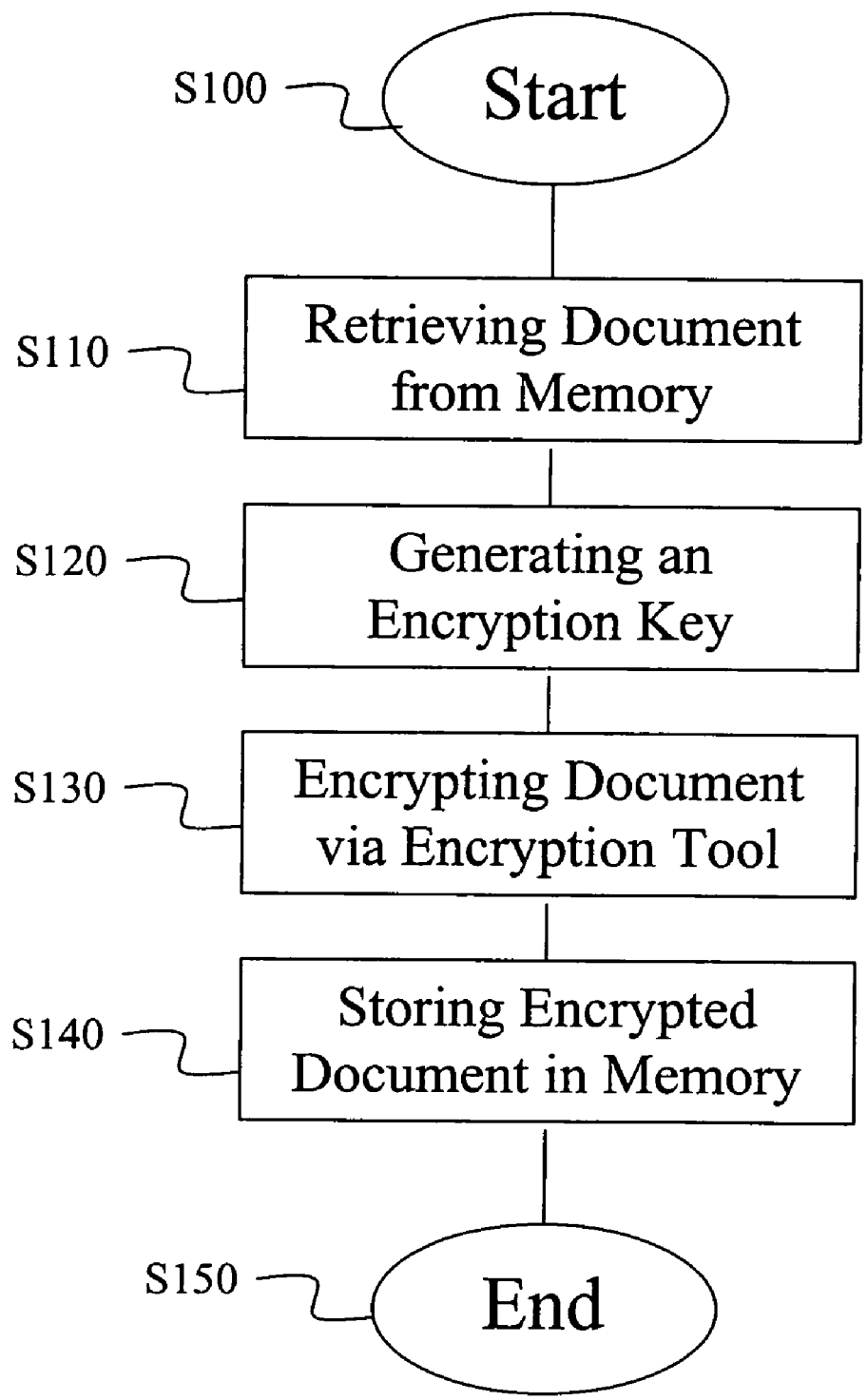
FIG. 2 is a flowchart illustrating an exemplary document protection method.

FIG. 2 is a flowchart illustrating an exemplary document protection method. In FIG. 2, the method starts at step S100, and continues to step S110, in which a document may be retrieved from a memory for encryption. According to various exemplary implementations, the memory may be accessed by a print driver or a print server. Next, control continues to step S120, in which a suitable encryption key may be generated. According to various exemplary embodiments, the encryption key may be imaged on a physical medium such as, for example, a piece of paper. Next, control continues to S130, in which the document may be encrypted via an encryption tool and using the encryption key. According to various exemplary embodiments, the encryption tool may comprise any known or hereafter developed encryption algorithm. Next, control continues to step S140, in which the encrypted document is securely stored until it is needed. Next, control continues to step S150, where the method ends.

Figure 3:
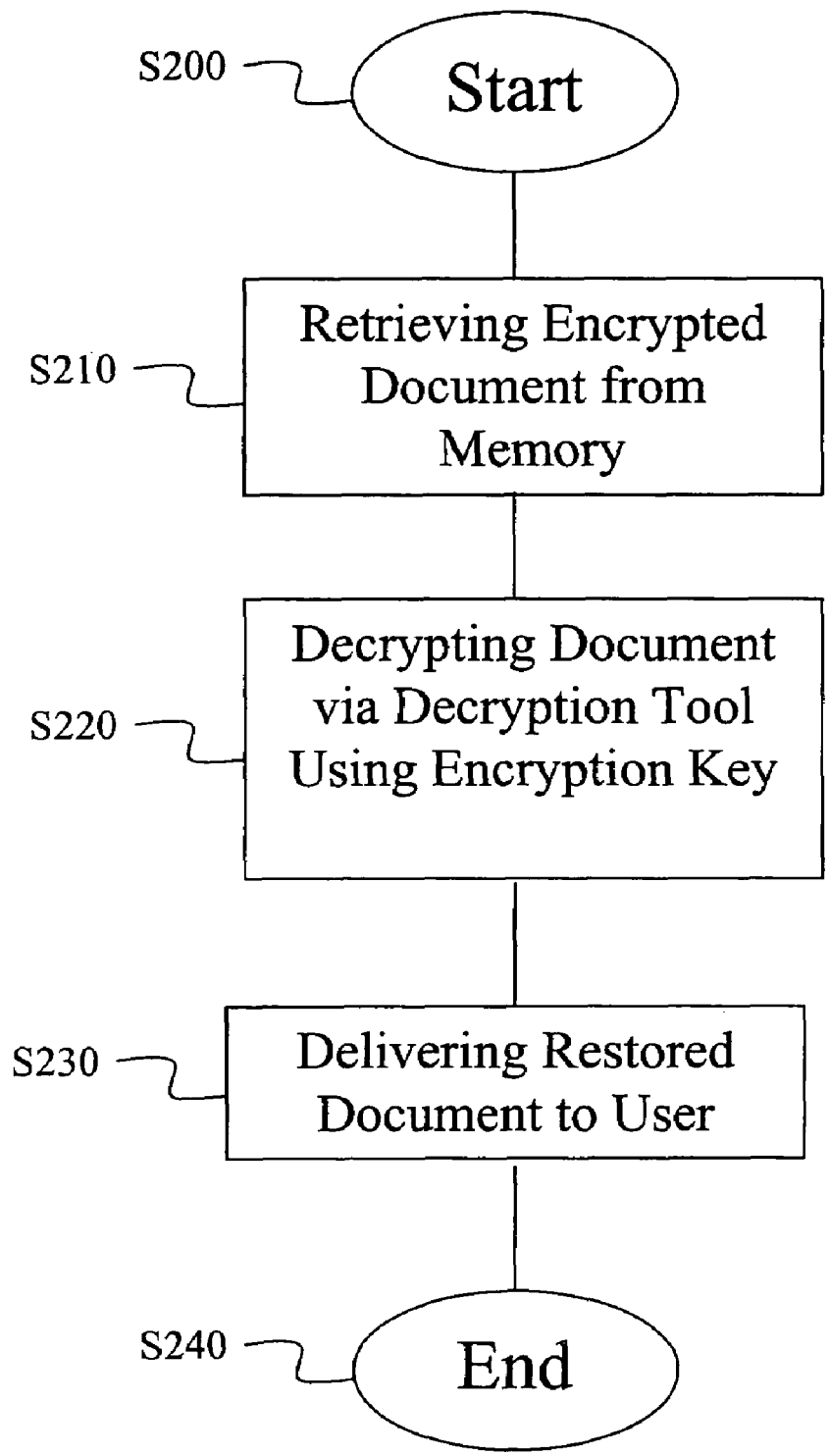
FIG. 3 is a flowchart illustrating an exemplary document protection method.

FIG. 3 is a flowchart illustrating an exemplary document protection method. In FIG. 3, the method starts in step S200, and continues to step S210, in which an encrypted document is retrieved from a memory. Next, control continues to step S220, in which the document is decrypted via a decryption tool. According to various exemplary embodiments, the document is decrypted using a decryption key. According to various exemplary embodiments, the decryption may or may not be identical to the encryption key used to encrypt the document in the first place. According to various exemplary embodiments, an encryption tool as discussed above may be used to generate the encryption and decryption keys. Also, the decryption key may be imaged on a medium and, for example, may be printed on paper. The encryption tool may be a standalone application, or may be integrated with existing print architecture components such as, for example, print drivers, print servers, or a printing device's embedded software.

According to various exemplary implementations, the encryption algorithm may include some data related to the device on which the decryption key is generated, the date and time of generation of the decryption key, user information, or any other identifying meta-data which may be required at a later time and that a legitimate user may be expected to have.

According to various exemplary implementations, the decryption key imaged on the medium may be encoded in, for example, barcodes, glyphs, text, images or any other imaging symbology. The decryption key may also be encrypted with user, system, enterprise, or device attributes or keys to further constrain the opportunity for misapplication or for the decryption key to be used by an un-authorized person. According to various exemplary implementations, the decryption key that was maintained on a medium such as, for example, paper, may be scanned to input the necessary key and associated meta-data to the decryption unit to authorize the access. Also, the scanning component may be integrated into a scanning device's embedded software, or may comprise a standalone application or a component of existing scan architectures that process scanned image data on client or server computers. According to various exemplary implementations, the scanning and printing devices need not be associated with each other, although they may exist in the same machine such as, for example, a multifunction machine, in some configurations. According to various exemplary implementations, data relative to the scanning component on which the decryption key is to be scanned may be included in the encryption algorithm. Accordingly, it may be possible to ensure that the decryption key is scanned by a designated scanning device, to be properly decrypted by the appropriate user with the necessary metadata information. Next, control continues to step 230, in which the decrypted document is delivered to the authorized user in whatever form is desired. Next, control continues to step S240, in which the method ends.

Figure 4:
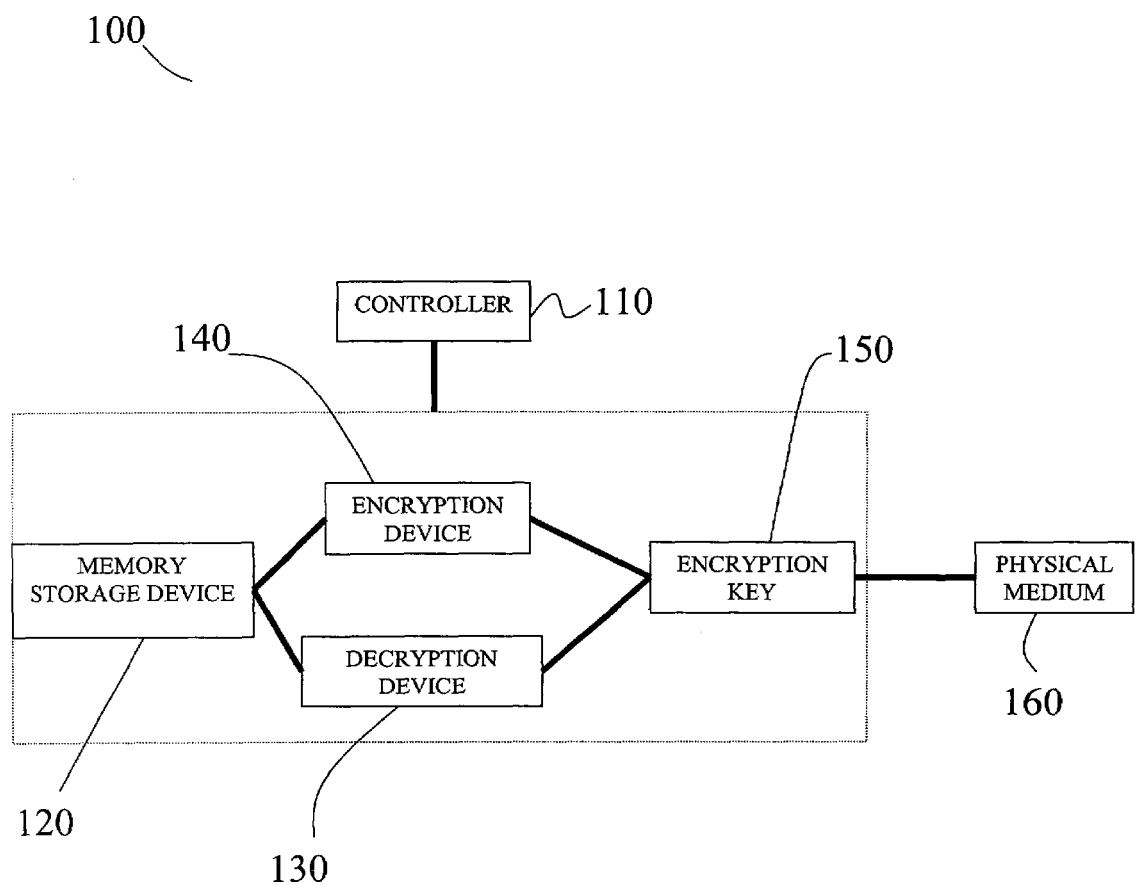
FIG. 4 is a diagram illustrating an exemplary document protection system.
Figure 5:
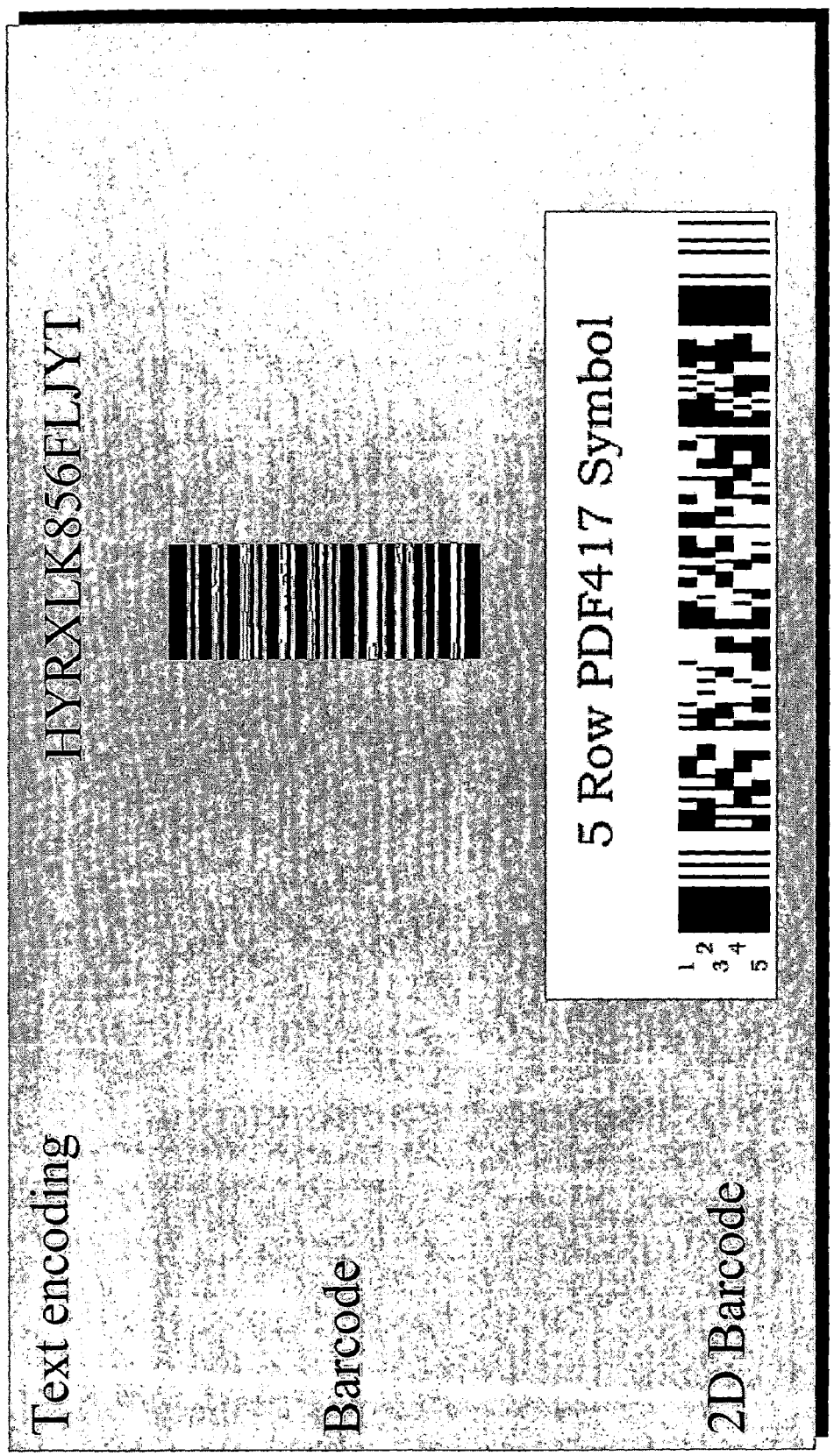
FIG. 5 is an exemplary illustration of a decryption key printed on a medium.

FIG. 4 is a diagram illustrating an exemplary document protection system. In FIG. 4, a controller 110 is configured to control the encryption and decryption operations of the system. According to various exemplary implementations, a document may be retrieved from a memory device 120. The memory device 120 may be part of a stand-alone computer, a server or a network. The document may then be encrypted via an encryption device 140. According to various exemplary implementations, the encryption device 140 may comprise a printer, and may be part of at least one of a print driver, a print server, and an embedded software of the printer. The encryption device 140 may also generate a decryption key 150. For example, the encryption device 140 may generate the decryption key 150 by printing the decryption key 150 on a medium 160 such as, for example, paper. The decryption key 150 may include attributes from the user, the system used by the user, the device on which the document is stored, and/or the device on which the document is generated. The decryption key 150 may comprise a barcode, a glyph, text, an image, and/or an imaging symbology. According to various exemplary embodiments, the decryption key 150 may then be decrypted by using the decryption device 130. According to various exemplary embodiments, the decryption device 130 may comprise a scanner configured to scan the medium 160 to retrieve the decryption key 150. Also, the decryption device 130 may locate, identify and decode the decryption key 150 provided on the medium 160. An exemplary decryption key 150 is illustrated in FIG. 5.

It will be appreciated that variants of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A document protection method, comprising:
retrieving an electronic document from a memory device;
encrypting the document using an encryption tool;
printing a decryption key on a hard medium;
storing the encrypted document in electronic form in a device and deleting the decryption key from the device;
retaining the decryption key remote from the device containing the encrypted document during storage;
decrypting the encrypted document by scanning the hard medium to obtain the decryption key; and
outputting the decrypted document,
wherein encrypting the document comprises using attributes of a user, a system, an enterprise, a device that stores the document, and a device that generates the document.

2. The method of claim 1, further comprising decrypting the document using a decryption tool.

3. The method of claim 1, wherein additional information useful to authorizing valid decryption is encoded with the decryption key on the medium.

4. The method of claim 1, wherein printing a decryption key comprises printing at least one of a barcode, a glyph, text, an image, and an imaging symbology.

5. The method of claim 1, wherein scanning the decryption key comprises scanning the medium using a scanner.

6. The method of claim 5, wherein scanning the medium comprises:
locating the decryption key on the medium;
identifying the decryption key; and
decoding the decryption key.

7. The method of claim 5, further comprising:
applying additional authorization information encoded with the decryption key on the medium to ensure authorized access to the document, the additional authorization information being information related to the scanner; and
determining access to the document based on the additional authorization information.

8. The method of claim 1, wherein the medium comprises paper.

9. A document protection system, comprising:
an encryption tool configured to encrypt a document as an electronic encrypted document;
at least one central processing unit configured to control printing of a decryption key on a hard medium remotely removable from the system;
a memory storage device configured to store the encrypted electronic document without the decryption key, the hard medium being stored remotely from the memory storage device; and
a decryption tool configured, when decryption of the encrypted electronic document is needed, to scan the decryption key on the hard medium to decrypt the encrypteddocument,
wherein encrypting the document comprises using attributes of a user, a system, an enterprise, a device that stores the document, and a device that generates the document.

10. The system of claim 9 wherein the encryption tool comprises a printer.

11. The system of claim 9, wherein the encryption tool is part of at least one of a print driver, a print server, and an embedded software of a printer.

12. The system of claim 9, wherein the decryption key comprises attributes from at least one of a user, a system, an enterprise, a device that stores the document, and a device that generates the document.

13. The system of claim 9, wherein the decryption key comprises at least one of a barcode, a glyph, text, an image, and an imaging symbology.

14. The system of claim 9, wherein the decryption tool comprises a scanner.

15. The system of claim 9, wherein the medium comprises paper.

16. A xerographic device comprising the document protection system of claim 9.

17. A computer-readable storage medium storing a program that causes a central processing unit to:
retrieve an electronic document from a memory device;
encrypt the document using an encryption tool;
print a decryption key on a hard medium;
store the encrypted document in electronic form in a device and delete the decryption key from the device;
retain the decryption key remote from the device containing the encrypted document during storage;
scan the hard medium to obtain the decryption key;
decrypt the encrypted document using the decryption key; and
output the decrypted document,
wherein encrypting the document comprises using attributes of a user, a system, an enterprise, a device that stores the document, and a device that generates the document.

* * * * *